United States Patent [19]
van der Lely et al.

[11] 3,765,491
[45] Oct. 16, 1973

[54] TINE CULTIVATOR WITH RELEASABLE STRIKING TOOL

[76] Inventors: Ary van der Lely, 10, Weverskade, Maasland; Cornelis Johannes Gerardus Bom, 36, Esdoornlaan, Rozenburg, both of Netherlands

[22] Filed: Sept. 29, 1971

[21] Appl. No.: 184,679

[30] Foreign Application Priority Data
Sept. 29, 1970 Netherlands .................... 7014267

[52] U.S. Cl. .................... 172/189, 172/28, 172/45, 172/96, 172/111, 172/253
[51] Int. Cl. ........................................... A01b 49/04
[58] Field of Search ............ 172/27–28, 39, 45, 47, 172/59, 96, 111, 189, 252–253, 438, 526, 529; 56/6, 295

[56] References Cited
UNITED STATES PATENTS

| | | | |
|---|---|---|---|
| 12,377 | 2/1855 | Haggard et al. | 172/28 |
| 2,706,441 | 4/1955 | Caldwell et al. | 172/28 |
| 3,400,521 | 9/1968 | Caldwell | 56/6 |
| 2,597,485 | 5/1952 | Hillyer | 172/45 |
| 3,097,466 | 7/1963 | King | 172/45 |
| 1,870,932 | 8/1932 | Sternemann | 172/45 |
| 3,157,015 | 11/1964 | Russell et al. | 56/295 |
| 3,167,899 | 2/1965 | Best | 172/45 |

FOREIGN PATENTS OR APPLICATIONS

| | | | |
|---|---|---|---|
| 6,805,358 | 10/1969 | Netherlands | 172/111 |
| 6,715,977 | 5/1969 | Netherlands | 172/59 |
| 467,333 | 8/1950 | Canada | 172/45 |

Primary Examiner—Robert E. Pulfrey
Assistant Examiner—Eugene H. Eickholt
Attorney—Mason, Mason & Albright

[57] ABSTRACT

A cultivator has rotatable soil-working tines to which flexible striking tools can be releasably attached. The striking tools can be attached to spaced apart tines to cut vegetation between ridges of row crop. The striking tools are slideably secured to the tines and can be flexible to extend horizontally during rotation of the tines.

14 Claims, 10 Drawing Figures

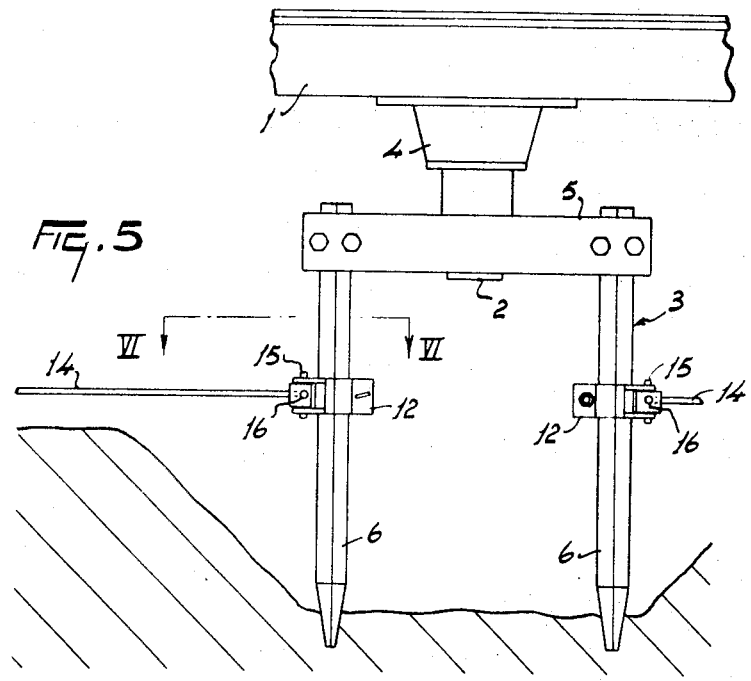
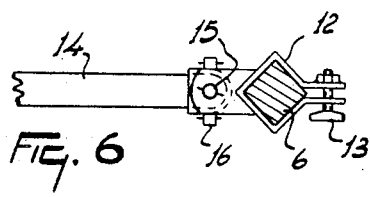
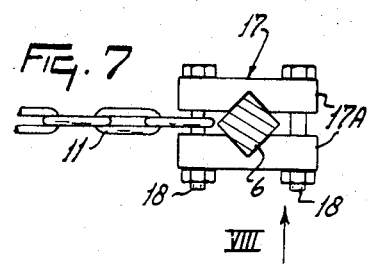
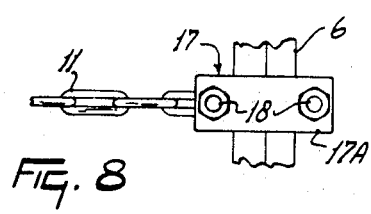
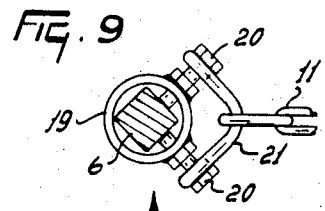
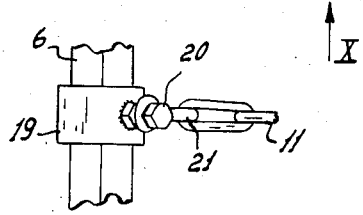

3,765,491

TINE CULTIVATOR WITH RELEASABLE STRIKING TOOL

This invention relates to cultivators of the kind comprising a frame and a plurality of normally tined soil working members arranged in a row in side-by-side relationship with each soil working member rotatable about a corresponding upright axis.

Known cultivators of this kind are suitable only for the breaking up of soil and, accordingly, are somewhat expensive having regard to their lack of versatility. It is an object of the present invention to overcome, or at least reduce, this disadvantage by increasing the number of operations which such cultivators can perform without appreciably adding to the complexity of the cultivators.

According to the invention, there is provided a cultivator of the kind set forth, wherein the tines of some of the soil working members have striking tools releasably secured to them.

Figure 1:
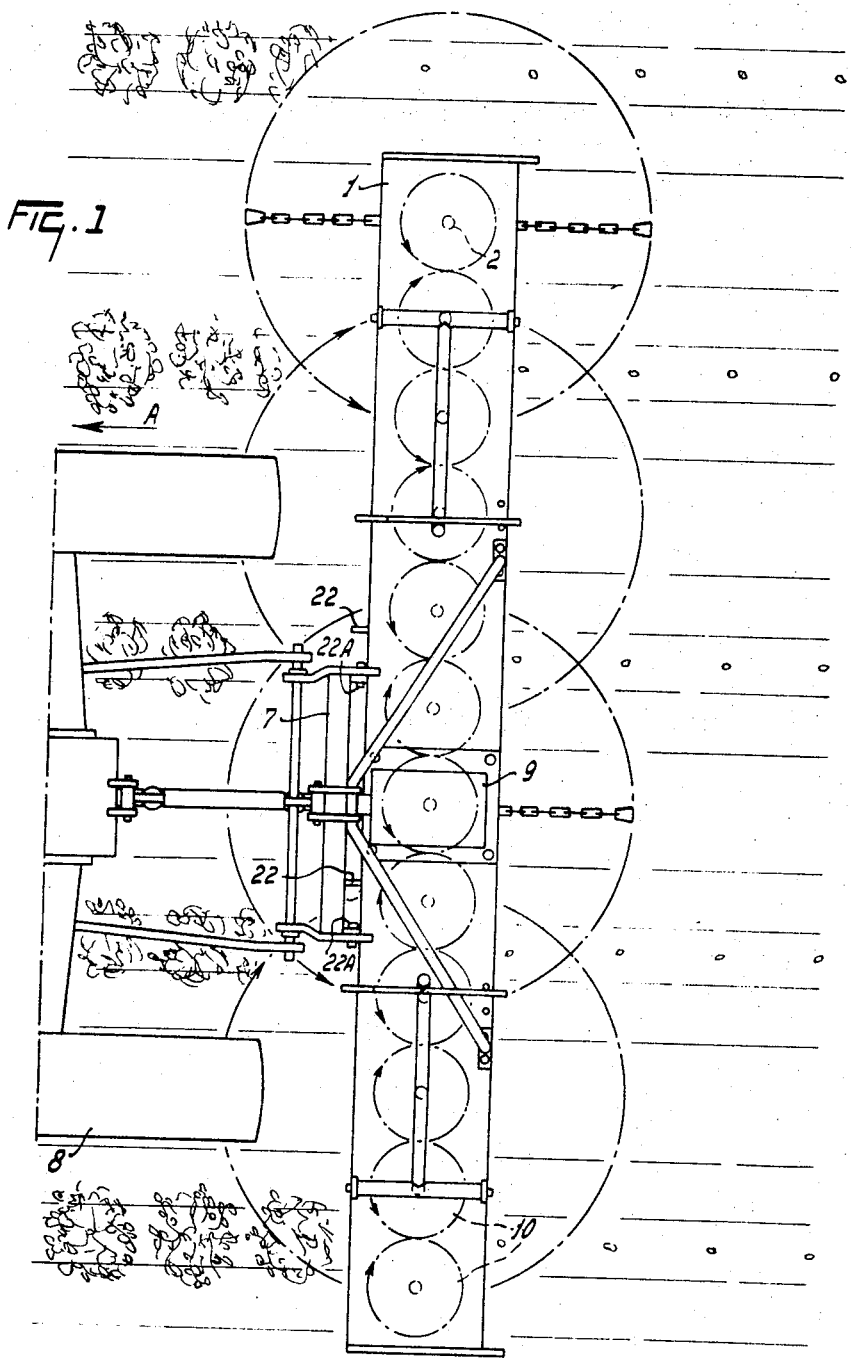
Figure 2:
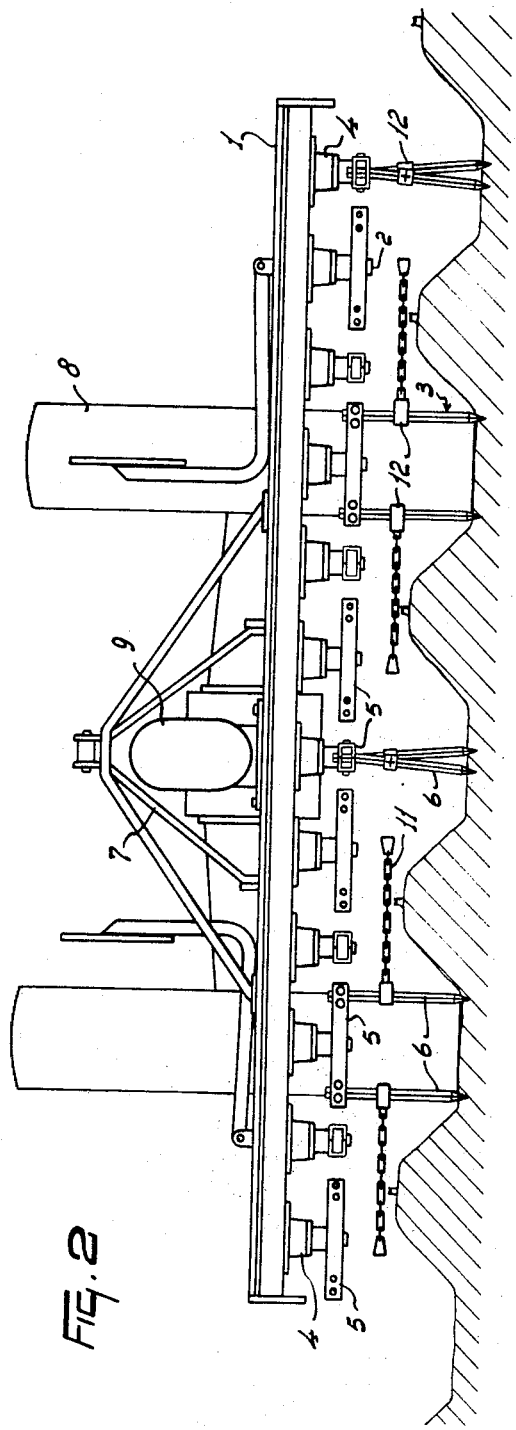
Figure 3:
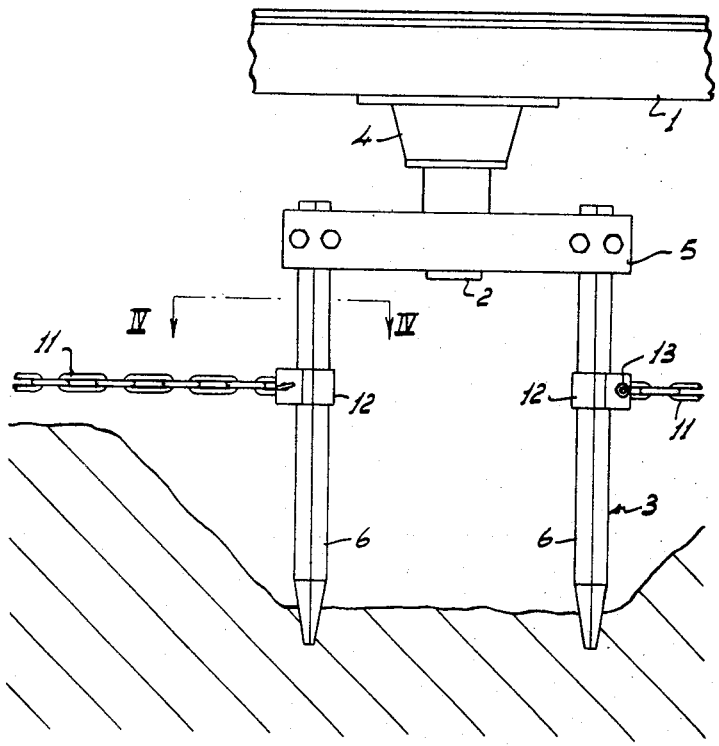
Figure 4:
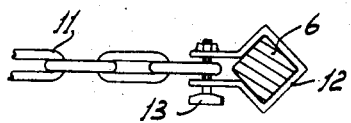

For a better understanding of the invention, and to show how the same may be carried into effect, reference will now be made, by way of example, to the accompanying drawings, in which:

FIG. 1 is a plan view of a cultivating implement or cultivator in accordance with the invention mounted at the rear of an agricultural tractor, FIG. 2 is a rear elevation corresponding to FIG. 1, FIG. 3 is a fragmentary rear elevation showing the construction and arrangement of one of the soil working members of the cultivator to an enlarged scale and in greater detail, FIG. 4 is a section taken on the line IV—IV of FIG. 3, FIG. 5 corresponds to FIG. 3 but illustrates an alternative construction, FIG. 6 is a section taken on the line VI—VI of FIG. 5, FIG. 7 corresponds to FIGS. 4 and 6 but shows an alternative construction, FIG. 8 is a view as seen in the direction indicated by an arrow VIII in FIG. 7, FIG. 9 corresponds to FIGS. 4, 6 and 7 but illustrates a further alternative construction, and FIG. 10 is a view as seen in the direction indicated by an arrow X in FIG. 9.

Referring to FIGS. 1 to 4 of the drawings, the soil cultivating implement or cultivator which is illustrated has a frame that is afforded principally by a hollow box-shaped main frame beam 1 that extends substantially horizontally perpendicular to the intended direction of operative travel of the cultivator which is indicated by an arrow at the left-hand side of FIG. 1 of the drawings. The main frame beam 1 supports a single row of 12 soil working members 3 each of which is fastened to the lowermost end of a corresponding upright substantially vertical shaft 2 that is rotatably journalled in the beam 1 with the aid of a corresponding bearing 4. The lowermost end of each upright shaft 2 is provided with a corresponding tine support 5 in the form of two generally strip-like members whose opposite ends are clamped to one another by bolts around the upper fastening portions of two tines 6. As can be seen in the drawings, the two tines 6 of each soil working member 3 are located diametrically opposite to one another as regards the corresponding upright shaft 2 and it will be noted that the 12 soil working members 3 are so arranged that the longitudinal direction of each tine support 5 is perpendicular to the longitudinal direction of the support 5 of the neighbouring member 3 or each of the neighbouring members 3. The perpendicular distance between the axes of rotation of neighbouring shafts 2 is preferably 25 centimeters and the tines 6 of each member 3 are spaced apart from one another by a slightly greater distance so that, during the use of the cultivator, the strips of land worked by the individual members 3 overlap one another to produce a single broad strip of worked land. The tines 6 have an angular cross-section which, as illustrated, is preferably square, said cross-section being of substantially constant shape and area throughout the length of each tine with the exception of a lowermost tip region that tapers to form a blunt point.

Two alternative pairs of lugs 22 project forwardly from the front of the main frame beam 1 in a generally central area of that beam and a trestle-shaped coupling member 7 can have a lower region thereof connected to a chosen pair of the lugs 22 by horizontal bolts or pins 22A. Tie bars that can be seen in FIGS. 1 and 2 of the drawings extend rearwardly in diverging relationship from the top of the coupling member 7 to the rear of the upper surface of the main frame beam 1 and, as shown in FIG. 1 of the drawings, two alternative locations are provided at which the rearmost ends of said tie bars can be bolted to the main frame beam 1. This arrangement enables the coupling member 7 to be fastened to the remainder of the cultivator with the main frame beam 1 offset to the right to some extent, as illustrated, or to be connected to said beam 1 so as to occupy a truly central position in relation thereto. These two different positions are suitable for alternative modes of working as will hereinafter be described. The coupling member 7 is shaped for connection to the three-point lifting device or hitch of a tractor 8, or other operating vehicle, as illustrated in the drawings and, in order to drive the soil working members 3, a forwardly projecting rotary input shaft of a gear box 9 mounted approximately centrally on top of the main frame beam 1 is placed in driven connection with the power take-off shaft of the tractor 8 or other operating vehicle by way of an intermediate telescopic transmission shaft of known construction having universal joints at its opposite ends. An upper region of each shaft 2, located internally of the hollow beam 1, is provided with a corresponding toothed pinion 10 and it will be seen from FIG. 1 of the drawings that the teeth of all the pinions 10 mesh with one another with the pinion 10 that is located immediately beneath the gear box 9 being driven by way of the transmission members that are contained within that gear box.

In accordance with the invention, the cultivator which has been described can be rendered capable of being used in an alternative manner for cutting down weeds, low shrubs and like plants, or for cutting off the haulms of potato plants or other plants growing in rows. This is achieved by removing the tines 6 from each of the soil working members 3 with the exception of every third soil working member of the row. Striking tools 11 are then fastened to each remaining pair of tines 6 with the aid of corresponding clamping members 12, the clamping members 12 being readily attachable to, and detachable from, the tines 6 with the aid of bolts 13 that preferably have winged heads (see FIG. 4). It should be noted that the tines 6 can readily be attached to, and detached from, their supports 5 merely by loosening or tightening the bolts at the ends of said supports 5 as may be required. The striking tools 11 that are shown in FIGS. 1 to 4 of the drawings take the form of chains each having a length of not less than substantially 37 centimeters and not more than substantially 70 centimeters. When fully extended in a radial direction, each chain reaches nearly, but not quite, to the shaft 2 of the next soil working member 3 along the row whose tines 6 remain in place and are provided with further striking tools 11. As illustrated in the drawings, the radially outermost end of each chain is preferably provided with a trapezoidal flail-like member that is larger and heavier than the individual links of the chains. This arrangement improves the efficiency of the striking tools 11. The striking tools 11 extend substantially horizontally when the shafts 2 are rotating due to the centrifugal force acting upon them and, due to the nature of the chains from which they are formed, they are substantially universally turnable relative to the clamping members 12 by which their radially innermost ends are connected to the tines 6.

FIGS. 5 and 6 of the drawings illustrate an alternative construction in which striking tools 14 in the form of spring steel strips are provided. In this case, the tools 14 are again substantially universally turnable relative to the corresponding clamping members 12 since their radially innermost ends are coupled to brackets by horizontal pivot pins 16 which brackets, in turn, are coupled to the clamping members 12 themselves by vertical pivot pins 15. Once again, the striking tools 14 extend substantially horizontally during their use and it will be realised that, with both of the embodiments which have so far been described, the effective levels of the striking tools 11 or 14 can be changed merely by loosening the wing bolts or other bolts 13 and sliding the clamping members 12 upwardly or downwardly along the tines 6 as may be required before retightening the bolts 13.

FIGS. 7 and 8 of the drawings illustrate an alternative clamping member 17 that is afforded principally by two similar but opposed portions 17A. The two portions 17A are both grooved to match the angularity of the tines 6 with which they co-operate and they are clamped tightly around individual tines 6 with the aid of two horizontal bolts 18 located at opposite sides of the tine 6 concerned. The radially innermost link of the chain of one of the striking tools 11 is loosely engaged around the shank of one of the bolts 18 between the two clamping member portions 17A so that said bolt 18 effectively functions in the same manner as the previously described wing bolt or other bolt 13.

FIGS. 9 and 10 of the drawings illustrate a further alternative clamping member 19 in the form of a ring that surrounds a chosen one of the tines 6. The ring is secured against displacement relative to the tines 6 by two set bolts 20 whose longitudinal axes are inclined to one another by, preferably, 90°. A generally V-shaped support 21 extends between the shanks of the two set bolts 20 and the radially innermost link of the chain of a corresponding one of the striking tools 11 has the "point" region of the V-shaped support 21 entered through it. The V-shaped support 21 extends generally horizontally and effectively connects the inner end of the striking tool 11 to the ring of the clamping member 19 and thus to the corresponding tine 6.

When the cultivator is provided with the striking tool 11 or 14, transmission members are arranged inside the gear box 9 to produce a speed of rotation of the shafts 2 of substantially 480 revolutions per minute in response to the normal speed of rotation of the power takeoff shaft of the tractor 8. This speed of rotation operates the striking tools 11 or 14 with an optimum effect. As the tractor 8 moves over the ground in the direction indicated by the arrow in FIG. 1 of the drawings, the striking tools 11 or 14 will be substantially horizontally disposed in the manner illustrated in FIGS. 1 and 2 of the drawings. Any weeds, low shrubs or other like plants that are disposed in the path of movement of the striking tools 11 or 14 will be cut off at a horizontal level corresponding to that of the striking tools. Clearly, the tools 11 or 14 will be arranged close to the tips of the tines 6 when the primary purpose of the operation is the destruction of weeds, low shrubs and other plants since such plants will then be cut off very close to the ground surface. Manure, straw tailings and the like can also be spread uniformly over the surface of the ground by using the striking tools 11 or 14 and, for this purpose, said striking tools are again arranged at a low level on the tines 6.

When the cultivating implement or cultivator is to deal with the haulms of potatoes or other plants growing under ridge culture, the striking tools 11 or 14 are mounted at higher horizontal levels on the tines 6 such that the striking tools will cut off the haulms growing on top of the ridges without normally contacting the ridged soil. The tines 6 themselves then operate between the ridges as can be seen best in FIG. 2 of the drawings and said tines will cut off any laterally extending haulms or the haulms of any accidentally displaced plants that are growing between, rather than in, the ridges. Both the tines 6 and the striking tools 11 or 14 throw the cut down haulms rearwardly with respect to the direction of travel of the cultivator. When the cultivator is to be used principally for potato culture, it is desirable, but not absolutely essential, to replace the standard tines of substantially 25 centimeters in length by tines of a greater length which is preferably substantially 35 centimeters. It can thus be ensured that the tines will have sufficient length to penetrate effectively into the soil between the ridges in which the potatoes are actually grown. The possibility of arranging the coupling member 7 in two different positions relative to the main frame beam 1 of the cultivator, as previously described, allows either of two different working positions to be chosen so that the most favourable one of them can be employed with a view to positioning the tines 6 and striking tools 11 or 14 correctly with respect to the potato ridges when the wheels of the tractor 8 are properly aligned between said ridges.

By employing the cultivator construction which has been described, the versatility of the cultivator is considerably increased in a simple manner and, in particular, the cultivator is rendered suitable for cutting off haulms so that another implement specifically designed for that purpose is no longer required. The described cultivator operates particularly effectively with potatoes grown in ridges since it efficiently cuts down the haulms located between the ridges as well as those on top of the ridges. Known haulm stripping implements designed for use with potato crops do not operate very effectively in this respect since their striking tools must be arranged to clear the tops of the ridges if damage is to be avoided to the many potatoes that are located very close to the surface in the soil of the ridges. The known haulm strippers thus tend to miss haulms growing between the ridges.

While various features of the cultivator that has been described, and that is illustrated in the drawings, will be set forth in the following claims as inventive features, it is to be noted that the invention is not necessarily limited to these features and that is encompasses all of the features that have been described and illustrated both individually and in various combinations.

What we claim is:

1. A cultivator comprising a frame and coupling means for attachment to a tractor, a plurality of side-by-side soil-working members supported on said frame in a row transverse to the direction of travel, said soil working members being rotatable about upwardly extending axes and being drivenly connected to drive means and a source of power, said soil-working members each having generally vertically extending tine means with striking tools releasably connected to the tine means of at least one of said soil-working members, with clamping means, said clamping means and striking tools being slideable and adjustable vertically, along the lengths of said tine means whereby vegetation can be cut at selected heights by said striking tools during operation of said soil-working members.

2. A cultivator as claimed in claim 1, wherein said tine means includes a pair of tines secured to every third soil-working member of said row with striking tools connected to each tine, the remaining soil-working members having their tines removed, whereby the striking tools can be rotated along horizontal paths below said soil-working members.

3. A cultivator as claimed in claim 2, wherein the axes of rotation of said soil-working members with tines and striking tools, are spaced apart from one another by substantially 75 centimeters and each striking tool has a maximum length of not more than 70 centimeters.

4. A cultivator as claimed in claim 3, wherein each striking tool has a minimum length of about 37 centimeters and a maximum length of about 70 centimeters.

5. A cultivator comprising a frame and coupling means for attachment to a tractor, a plurality of side-by-side soil-working members supported on said frame in a row transverse to the direction of travel, said soil-working members being rotatable about upwardly extending axes and being drivenly connected to drive means and a source of power, said soil-working members each having a pair of generally vertical tines that extend downwardly on opposite sides of the axis of rotation of their respective soil-working members, striking tools releasably connected to more than one pair of said tines with clamping means, said tools and said clamping means being slideable and adjustable vertically along the lengths of said tines, whereby vegetation can be cut at selected heights by said striking tools during operation of said cultivator members.

6. A cultivator as claimed in claim 5, wherein the connections between said striking tools and their respective tines are quick releasable clamps having at least one accessible bolt.

7. A cultivator as claimed in claim 5, wherein each striking tool is turnable relative to its respective tine about both a vertical axis and a horizontal axis.

8. A cultivator as claimed in claim 5, wherein each striking tool is flexible.

9. A cultivator as claimed in claim 8, wherein each striking tool comprises a chain.

10. A cultivator as claimed in claim 8, wherein each striking tool comprises a resilient strip.

11. A cultivator comprising a frame and coupling means for attachment to a tractor, a plurality of side-by-side soil-working members supported on said frame in a row transverse to the direction of travel, said soil-working members being rotatable about upwardly extending axes and being drivenly connected to drive means and a source of power, said soil-working members each having generally vertical tines that are plural sided and said tines extending downwardly on opposite sides of the axis of rotation of their respective soil-working members, striking tools releasably connected to more than one pair of said tines with clamping means, said tools and said clamping means being slideable and adjustable vertically along the lengths of said tines, whereby vegetation can be cut at selected heights by said striking tools during operation of said cultivator members.

12. A cultivator as claimed in claim 11, wherein said striking tools are releasably secured to their respective tines by quick releasable clamping members.

13. A cultivator as claimed in claim 11, wherein said cultivator has spaced apart soil-working members side-by-side and spaced apart to culture plants grown in rows.

14. A cultivator as claimed in claim 13, wherein said cultivator has spaced apart soil-working members with tines to which striking tools are secured to work plants grown under ridge culture and to be movable longitudinally between ridges, the tines of those soil-working members in register with the ridges being removed.

* * * * *